Jan. 18, 1944. J. S. PARK 2,339,580
LUNCH BOX
Filed May 9, 1941
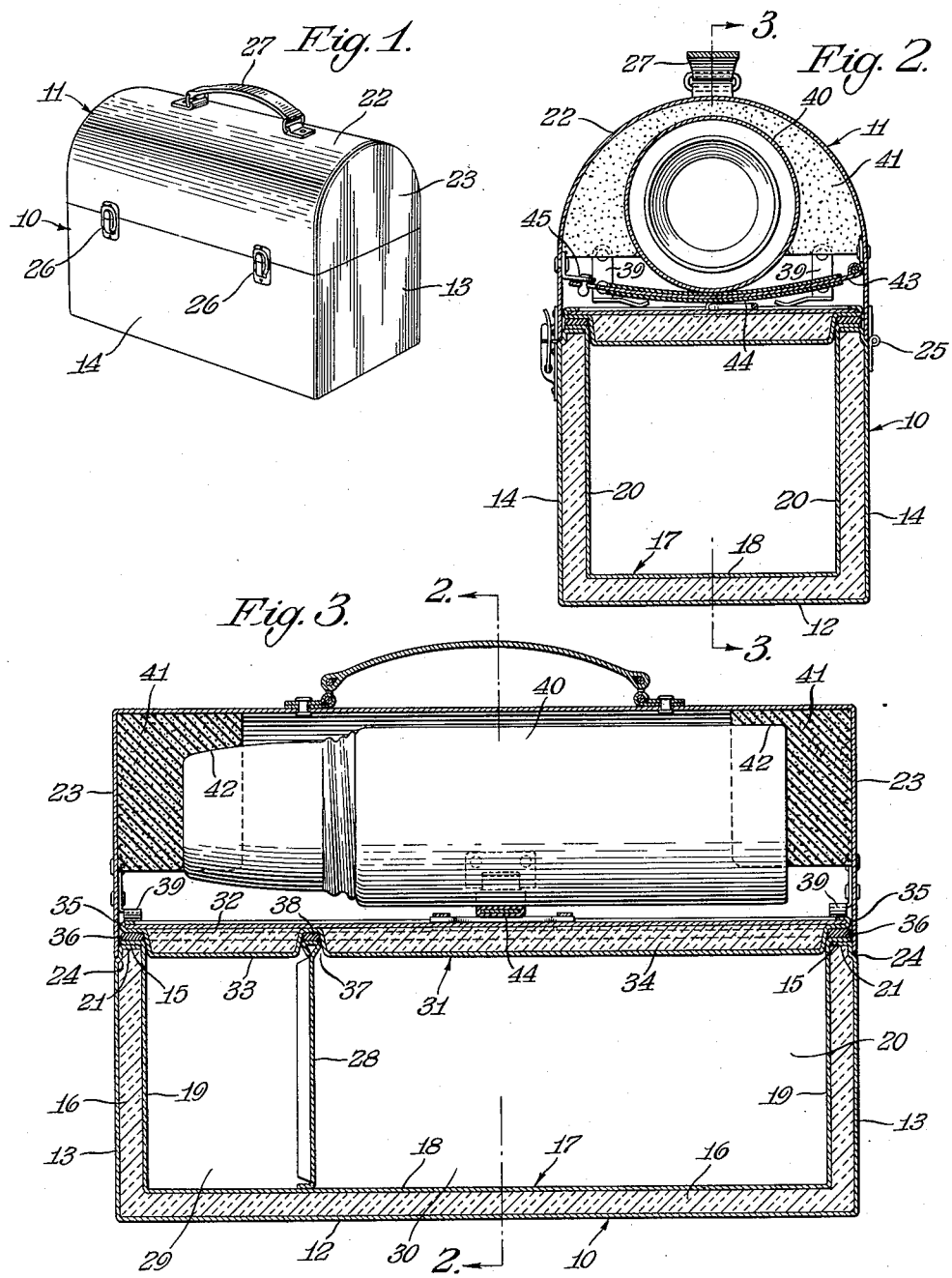
John S. Park.
INVENTOR
BY Victor J. Evans & Co.
ATTORNEYS Patented Jan. 18, 1944

2,339,580

UNITED STATES PATENT OFFICE 2,339,580

LUNCH BOX

John Stewart Park, Aliquippa, Pa.

Application May 9, 1941, Serial No. 392,792

3 Claims. (Cl. 206—4)

My invention relates broadly to food receptacles and more particularly to new and useful improvements in portable lunch boxes.

An important object of my invention is the provision of a portable lunch box that is suitably insulated against heat and cold whereby food placed therein while hot will stay in the heated condition for a considerable length of time and whereby food placed in the box will not spoil even though the box is exposed in extremely warm or humid weather.

Another object of my invention is the provision of a lunch box of the above-mentioned character that includes provision for holding a container for liquid free from engagement with any metallic parts, whereby to maintain the contents of the container at substantially its original temperature for a maximum length of time.

Still another object of my invention is the provision of a lunch box that includes provision for regulating the interior temperature of the box, the box being uniquely constructed to effectively prevent the contents of any one compartment from having access to any of the other compartments.

Yet another object of my invention is the provision of a portable lunch box that is essentially simple in its construction, inexpensive to manufacture and efficient and efficacious in the performance of its duties.

Other objects and advantages of my invention will be apparent during the course of the following description.

In the drawing, forming a part of this specification, and wherein like numerals are employed to designate like parts throughout the same, Figure 1 is a perspective view of a portable lunch box embodying my invention, Figure 2 is a transverse sectional view taken on the line 2—2 of Figure 3, and Figure 3 is a longitudinal sectional view taken on the line 3—3 of Figure 2.

In the accompanying drawing, wherein for the purpose of illustration, is shown a preferred embodiment of my invention, the numerals 10 and 11 designate companion receptacles. These receptacles are adapted to be fitted together and hingedly connect to provide a unitary structure and while they may be of any desired size or shape, I have here illustrated the receptacle 10 as being of essentially box-like formation and as comprising the body of the lunch box and the receptacle 11 as having an arcuately curved top and as comprising the cover thereof.

The body receptacle 10 is preferably constructed of a suitable metallic sheet material having a highly polished surface such as aluminum or the like. This receptacle is formed with an essentially rectangular bottom 12 having integral upstanding end walls 13 and side walls 14. The upper marginal edges 15 of the end and side walls are bent inwardly to overhang layers of heat insulating material 16 which entirely covers the inner surface of the bottom 12 and the end and side walls 13 and 14. The material 16 may be any substance suitable for the purpose described; however, I have found that fibre glass is extremely satisfactory for this purpose.

An inner lining or shell 17 is snugly fitted within the layers of insulating material 16, which shell comprises a rectangular bottom 18 having integrally connected upstanding end walls 19 and side walls 20. The upper marginal edges 21 of the side and end walls of the shell 17 are bent outwardly to overlie the inturned edge 15 of the outer shell. The inner and outer shells and the intermediate layer of heat and cold insulating material are associated in mutually pressed relation and the overlaying edges of the inner and outer shells are suitably connected, as by welding or riveting, to provide a compact unitary box-like container.

The upper receptacle 11 comprising the cover of the lunch box is formed from a metallic sheet which is bent longitudinally to provide an essentially U-shaped member 22, which member is of the same length as the receptacle 10 and has its opposite ends closed by integrally connected walls 23.

Thus, each of the receptacles 10 and 11 is provided with an open side and the marginal edge of the receptacle 10 is inwardly offset, as at 24, to receive the free edge of the companion receptacle or cover 11. As hereinbefore described, the receptacles are connected at one side thereof by the hinge members 25, whereby movement of the receptacles into closed relation with each other will effectively seal the interior of the box. The sides of the receptacles remote from the hinges 25 carry spring catches 26 for holding the same in the closed position and the cover 11 is provided with a suitable handle 27 which permits the box to be easily carried by the user.

I prefer that the lower receptacle or body 10 be adapted to contain food and it is my thought to divide the same into two compartments, one compartment being suited to receive the food and the other compartment being suited to contain a suitable temperature regulating medium. Obviously, during warm weather it will be desirable to maintain the interior of the lower receptacle in a cool condition to best preserve the food, and ice, or the like, will therefore be stored in the mentioned compartment. Conversely, during cold weather it is necessary to maintain the interior of the lower receptacle in a heated condition and hot water, or the like, is then placed in the compartment provided for this purpose. The partition 28 is of the same cross-sectional area as the inner shell 17 of the receptacle 10 and the bottom and side edges thereof have a fluid-tight union with the shell to divide the same into separate compartments 29 and 30.

In order that the body receptacle 10 may be separated from the cover receptacle 11, I have provided a lid 31 which comprises superposed layers 32 and 33 of sheet material having an insulating layer 34 interposed therebetween. The peripheral edge of the lid is formed with an extending lip 35 which overhangs the upper edge of the receptacle and a sealing strip 36 is carried by the lip to provide a fluid-tight union between the lid and the receptacle. In order that the lid may also seal the compartment 29 from the compartment 30, the layer 33 thereof is formed with a transverse groove 37, and the sealing strip 38 disposed within the groove engages the upper edge of the partition 28 to prevent the contents of one compartment from having access to the other of the compartments. When the receptacles comprising the box are in a closed position, the spring arms 39 carried by the end walls 23 of the upper receptacle move into tensioned engagement with the lid to hold the same tightly pressed against the upper edges of the body receptacle and its partition 28.

It will be readily apparent that the upper receptacle 11 is suitably shaped to receive a suitable liquid container 40, here illustrated as being in the nature of a thermos bottle. In order that the contacts of the container 40 may retain its original temperature for a maximum length of time, I have provided supporting blocks 41 of a suitable heat and cold insulating material in the opposite ends of the receptacle. The confronting surfaces of the blocks are formed with recesses 42 which receive the opposite ends of the container and maintain the same free from contact with the metallic parts of the receptacle. The strap 43 has one end of the receptacle 11 at substantially its middle. The strap extends transversely below the container 40 and the portion thereof which contacts the container is covered by a suitable heat and cold insulating sheath 44. The swinging end of the strap connects with a suitable latch element 45 carried by the receptacle. The strap itself is inherently springy or resilient in its nature and the latch 45 is located so that it will be necessary to slightly flex the strap before engagement may be effected between the strap and latch. The resilient action of the flexed strap will react against the container to at all times hold the same pressed against the blocks 41 and will prevent the same from moving or rolling about within its receptacle during transportation of the lunch box.

It may thus be seen upon releasing of the spring catches 26, the upper receptacle 11 may be swung upon the hinges 25 to open the lunch box. This action will move the spring arms 39 out of engagement with the lid 31 and permit the lid to be moved to open the lower receptacle or body 10. If it is desired to maintain the interior of the body in a cool condition, ice, or the like, is placed in compartment 29 and the food is stored in compartment 30. If it is desired to maintain the interior of the body in a heated condition, hot water or the like, is placed in the compartment 29. When the desired temperature regulating medium has been placed in its compartment and the food has been placed in the other of the compartments, the lid 31 is applied and by reason of the intermediate layer of insulating material 34, it will separate the body of the lunch box from the cover thereof. Thus, ice may be placed in compartment 29 to maintain the compartment 30 of the body in a cool condition and coffee or other heated liquids may be placed in the container 40 without being adversely affected by the temperature of the body. After the container 40 has been filled and placed in the cover 11, the cover is closed and the spring catches 26 will hold the cover and body in the closed position. As hereinabove described, the closing of the cover will cause the spring arms 39 to press against the lid 31 in a manner to efficaciously prevent the inadvertent displacement of the lid during the carrying of the lunch box.

It is to be understood that the form of my invention, herewith shown and described, is to be taken as a preferred example of the same, and that various changes in the size, shape and arrangement of parts may be resorted to without departing from the spirit of my invention or scope of the appended claims.

Having thus described my invention, I claim:

1. A lunch box comprising a thermally insulated receptacle having an open top, a thermally insulated lid removably fitting into the open top of the receptacle and closing the same, a cover carried by the receptacle and forming a compartment, thermally insulating supporting members mounted in the upper portion of the cover and having recesses adapted to receive the ends of a container, means actuated through closing of the cover for pressing said lid against said receptacle, and a strap carried by the cover and passing under the container for holding the same in the recesses and spaced from the insulated lid.

2. A lunch box comprising a thermally insulated receptacle having an open top, a thermally insulated lid removably fitting into the open top of the receptacle and closing the same, a cover carried by the receptacle and forming a compartment, thermally insulating supporting blocks mounted in the upper portion of the cover and having recesses to receive the ends of the container, a strap carried by the cover and passing under the container intermediate its ends for holding the same in the recesses in the blocks and spaced from the insulated lid, and spring arms carried by the cover and adapted to engage the insulated lid when the cover is closed for holding the same tightly in the open top of the receptacle.

3. A lunch box comprising a thermally insulated receptacle having an open top, an insulated lid removably fitting into the open top of the receptacle and closing the same, a cover hinged at one side to the receptacle and forming an enlarged compartment, blocks of thermally insulating material carried by the ends of the cover at their upper ends and having recesses adapted to receive the ends of a container, a strap secured to the side of the cover and passing under the container intermediate its end for holding the same in the recesses and spaced from the insulated lid, and spring arms carried by the ends of the cover adjacent the front and back of the cover and adapted to engage the insulated lid when the cover is closed for holding the same tightly in the receptacle.

JOHN STEWART PARK.